United States Patent [19]

Hashimoto

[11] 4,281,837

[45] Aug. 4, 1981

[54] WATER TIGHT SEAL STRUCTURE FOR CAMERA

[75] Inventor: Akihiko Hashimoto, Hachioji, Japan

[73] Assignee: Olympus Optical Co., Ltd., Tokyo, Japan

[21] Appl. No.: 56,300

[22] Filed: Jul. 10, 1979

[30] Foreign Application Priority Data

Oct. 24, 1978 [JP] Japan ................................ 53/129986

[51] Int. Cl.³ ........................ F16J 15/34; F16J 15/46; G03B 17/08

[52] U.S. Cl. ........................................ 277/12; 277/27; 277/95; 277/167.5; 277/205; 354/64; 354/266

[58] Field of Search ........................ 277/12, 50, 92, 95, 277/167.5, 205, 171, 212 F, 3, 27; 58/90 R, 90 B, 88 B; 352/174; 354/64, 266; 200/302

[56] References Cited

U.S. PATENT DOCUMENTS

| | | | |
|---|---|---|---|
| 2,405,087 | 7/1946 | Boninchi | 277/205 X |
| 2,482,583 | 9/1949 | Greenberg | 277/92 X |
| 2,733,567 | 2/1956 | Zellweger | 277/95 X |
| 2,740,023 | 3/1956 | Kryder | 200/302 X |
| 2,784,547 | 3/1957 | Waldman | 277/205 X |
| 4,031,348 | 6/1977 | Eberhardt | 200/302 X |
| 4,041,507 | 8/1977 | Ko et al. | 354/64 |
| 4,053,166 | 10/1977 | Domkowski | 277/205 X |
| 4,097,878 | 6/1978 | Cramer | 354/64 |

FOREIGN PATENT DOCUMENTS

| | | | |
|---|---|---|---|
| 340320 | 9/1959 | Switzerland | 277/95 |
| 1140064 | 1/1969 | United Kingdom | 200/302 |

Primary Examiner—Robert S. Ward, Jr.
Attorney, Agent, or Firm—Ostrolenk, Faber, Gerb & Soffen

[57] ABSTRACT

A water tight seal structure for a camera or other device comprises a step formed in the upper end of an opening provided in the frame of the device to pass a rotating shank body which forms a movable operating member of the device. Water repellent rubber is fixedly secured to the step. The inner peripheral surface or the upper surface of the water repellent rubber is maintained in tight engagement with the adjacent surface of the shank body to prevent an ingress of water into the device.

23 Claims, 7 Drawing Figures

WATER TIGHT SEAL STRUCTURE FOR CAMERA

BACKGROUND OF THE INVENTION

The invention relates to a water tight seal structure for camera, which may be used with an externally exposed control of a camera such as a winding lever, shutter button, film rewind shaft, for example.

A precision instrument such as camera or watch has its externally exposed parts provided with a water tight seal structure to protect them against rain, splashes of water, inadvertent drop into the water or to permit a positive use in water. A water tight seal structure for these exposed parts, in particular, one associated with a movable part which is used to provide a control must be constructed to achieve the sealing function without detracting from the operating ease of the control, which is difficult to achieve.

FIG. 1 illustrates an exemplary water tight seal structure used in the prior art with a movable part of a camera which is shown in cross section. It is to be understood that the illustration is limited to the lefthand part of the instrument. In FIG. 1, frame 1 represents a cover which encloses the entire assembly such as a camera. Frame 1 is formed with opening 5 to receive rotating shank body 4 which may constitute a shutter button, a winding lever, a film rewind shaft or a like movable member. Intermediate its length, the wall of opening 5 is formed with peripheral groove 2 therein in which O-ring 3 is disposed which is formed of rubber and elliptical in cross section. The outer, the upper and the lower surface of O-ring 3 tightly engages the bottom, the upper and the lower surface of peripheral groove 2 while the inner surface of O-ring 3 tightly engages an outer peripheral surface of rotating shank 4. Shank body 4 includes shank 4a which is disposed within opening 5, and disc 4b which is formed integrally with the upper end of shank 4a and projecting outside opening 5 and which is connected with an external rotatable control. The bottom end of shank 4a is formed as threaded portion 4c of a reduced diameter which is threadably engaged by lock nut 6.

In the seal structure described above, the tight engagement between O-ring with peripheral groove 2 on one hand and the outer peripheral surface of shank body 4 is intended to prevent an ingress of pressurized water into the interior of the instrument through a gap between frame 1 and shank body 4 as indicated by arrow $A_0$. However, the reduced area of contact between O-ring 3, shank body 4 and peripheral groove 2 is insufficient to provide a satisfactory water sealing function, allowing pressurized water to find its way into the interior through a clearance between O-ring 3 and shank body 4 and a clearance between O-ring 3 and peripheral groove 2, as indicated by arrows $A_1$, $A_2$.

In addition, since shank body 4 is supported by frame 1 only by the inner peripheral surface of O-ring 3 in addition to the support by nut 6, a clearance is likely to occur as shown between the inner peripheral surface of frame 1 and the outer peripheral surface of shank body 4, giving rise to a rattling of shank body 4. Furthermore, the spacing between frame 1 and shank body 4 is subject to variation, resulting in a varying momentum required to rotate shank body 4, making its operation more difficult.

SUMMARY OF THE INVENTION

It is an object of the invention to provide a water tight seal structure for a camera which eliminates above disadvantages by providing a soft member between an opening formed in an external frame and a rotary shank body disposed therein which is disposed in a manner to reliably prevent an ingress of a pressurized fluid through a clearance between these parts without causing a rattling of the shank body, and permitting a smooth rotation thereof.

In accordance with the invention, an external frame is formed with an opening for receiving a rotating shank therein. A step is formed in the upper end of the opening along its inner periphery, and a soft member formed of a soft material such as water repellent rubber is fixedly mounted on the step so that when the rotating shank body is disposed in the opening, it maintains a tight engagement with both the soft member and the inner surface of the opening. This eliminates an ingress of a pressurized fluid into the interior while avoiding a rattling of the shank body and allowing a smooth rotation thereof.

DESCRIPTION OF PREFERRED EMBODIMENTS

Figure 1:
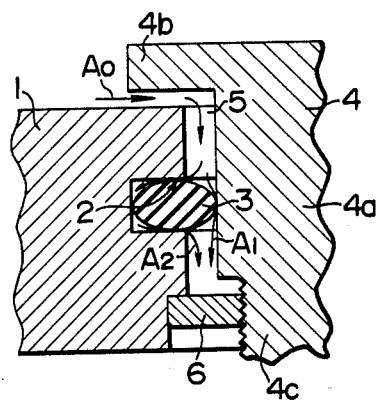
FIG. 1 is a cross section showing an exemplary water tight seal structure for camera used in the prior art, only left-hand half of the structure being shown.
Figure 2:
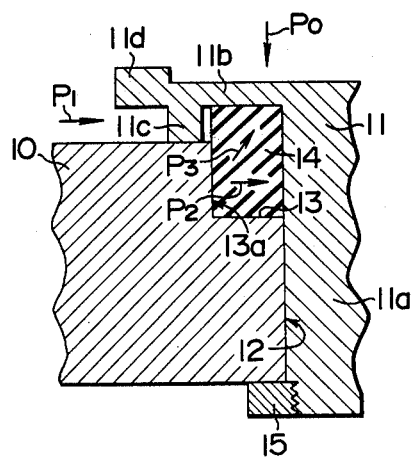
FIG. 2 is a cross section of a water tight seal structure for camera according to one embodiment of the invention, again illustrating the left-hand half thereof.

Referring to FIG. 2, there is shown frame or outer panel 10 which covers the entire camera. Frame 10 is formed with opening 12 for receiving rotating shank body 11 therein which may constitute a movable controlling member such as a winding lever, a shutter button or a film rewind shaft of a camera, for example. Shank body 11 includes shank 11a which is sized to tightly fit in opening 12 and extending axially of opening 12, disc 11b which is formed integral with the upper end of shank 11a and extending parallel to the upper surface of frame 10 from the upper end thereof which is located outside frame 10, annular depending projection 11c formed on the lower surface of disc 11b toward its outer periphery and extending into abutment against the outer surface of frame 10, and annular upper projection 11d formed on the upper surface of disc 11b toward its periphery.

Step 13 is formed in the upper end opening 12 to provide an increased diameter. Soft member 14 in the form of a short sleeve is disposed on step 13 and is formed of water repellent rubber or a like material which is effective to prevent a penetration of water. The inner peripheral surface of soft member 14 tightly engages the outer peripheral surface of shank 11a while the outer peripheral surface of soft member 14 is fixedly connected with peripheral wall 13a of frame 10 which is located above step 13. The lower end face of soft member 14 is also fixedly connected with step 13. The upper end face of the soft member is disposed for abutment against the lower surface of disc 11b. Instead of fixedly connecting the lower end face and the outer peripheral surface of soft member 14 to both step 13 and peripheral wall 13a, respectively, the member may be fixedly connected with frame 10 at one of these locations. Soft member 14 can be fixedly connected with the frame by adhesion or fusion. The lower end of shank 11a projects beyond the lower surface of frame 10, and is provided with a threaded portion which is threadably engaged by nut 15. By tightening nut 15 until its upper surface bears against the lower surface of frame 10, shank body 11 can be fixedly connected with frame 10.

In use, when a water pressure as indicated by arrows $P_0$, $P_1$ is applied to rotating shank body 11 from above and from a lateral direction, the water under pressure may find its way into the region of soft member 14 by passing through a clearance between the closely engaging surfaces of frame 10 and projection 11c, thus applying a pressure to soft member 14 from its left-hand side. In response thereto, soft member 14 is urged to the right and to the upper, right-hand direction as indicated by arrows $P_2$, $P_3$, whereby it strongly bears against the outer peripheral surface of shank 11a and the lower surface of disc 11b. The water under pressure tends to find its way into and through the space between the contacting surfaces of soft member 14, peripheral wall 13a and step 13 and through the contacting surfaces of soft member 14 and shank body 11, but since soft member 14 is fixedly connected with peripheral wall 13a and step 13 by adhesion or fusion as mentioned previously, the only way left for the water under pressure to proceed is a path between the contacting surfaces of soft member 14 and shank body 11. However, the water pressure applied to soft member 14 causes it to be strongly urged against the peripheral surface of shank 11a and the lower surface of disc 11b, so that the water cannot leak between the soft member 14 and shank body 11.

In the water tight seal structure described above, a member formed on Teflon may be applied to the side of soft member which is adapted to engage shank body 11 in order to permit a smooth rotation of the latter. Similarly, another soft member may be attached to the outer peripheral surface of shank body 11 in order to enhance the water tightness.

It is to be understood that the configuration of soft 13 and cross-sectional configuration of soft member 14 disposed thereon need not be rectangular as shown, but may be polygonal. However, it is essential that the soft member is in perfect abutment against the step.

Figure 3:
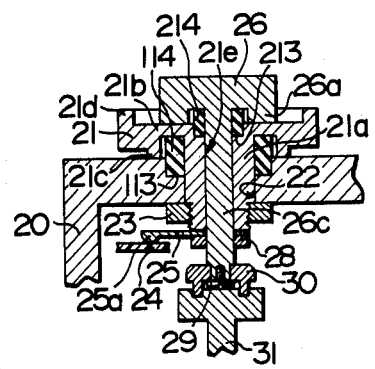
FIG. 3 is a cross section of a film winding lever assembly of a camera with which the water tight seal structure of the invention is used.
Figure 4:
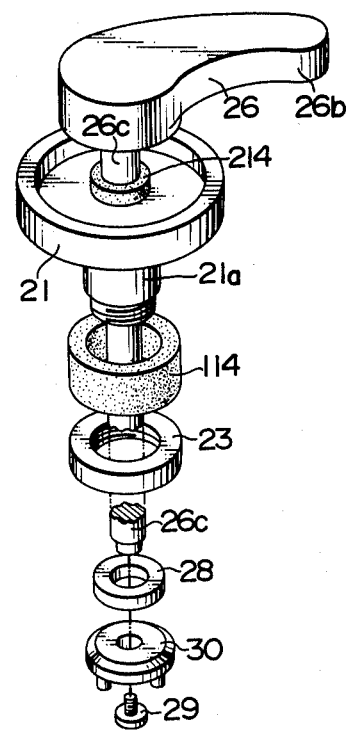
FIG. 4 is an exploded, perspective view of the film winding lever assembly shown in FIG. 3.

The described water tight seal structure can be applied to a film winding lever assembly, a shutter button assembly or a film rewind shaft assembly of a camera. These applications will be described below. FIGS. 3 and 4 illustrate the application of the seal structure to a film winding lever assembly. In FIGS. 3 and 4, frame or outer panel 20 which covers the entire camera is formed with opening 22 for receiving switching dial 21 therein, which is T-shaped in cross section. Switching dial 21 is used to change the operation of the camera between a soft-timer photographing mode, an automatic exposure mode and a manual mode. In a manner similar to rotating shank body 11 shown in FIG. 2, dial 21 comprises shank 21a, disc 21b and lower and upper projections 21c, 21d. In addition, it is formed with central bore 21e through which shaft 26c of winding lever 26 extends. Shank 21a extends through opening 22 formed in frame 20, and its lower end is threadably engaged by fixing nut 23, thus securing dial 21 to frame 20. In accordance with the invention, annular step 113 is formed in the upper end of opening 22 to provide an increased diameter, and water repellent rubber 114 in the form of a short sleeve is fixedly connected with step 113 in the same manner as soft member 14 is fixedly connected with step 13 in FIG. 2.

Step 213 is formed in the upper end of bore 21e to provide an increased diameter, and another water repellent rubber 214 in the form of a short sleeve is disposed on and fixedly connected with step 213 in the same manner as soft member 14 is fixedly connected with step 13 in FIG. 2. Shaft 26c of winding lever 26 extends through rubber member 214 and bore 21e, and includes a disc-shaped top which is provided with depending projection 26a which extends from the lower surface thereof adjacent to its periphery into abutting relationship against the upper surface of disc 21b. Switching member 25 is fitted over the lower end of shaft 26c and is fixedly connected with winding lever 26 by fixing nut 28 which threadably engages the shaft. Switching member 25 includes contact 25a on its free end which is adapted to slide over printed board 24. Claw ring 30 is secured to the lower end face of shaft 26c by means of set screw 29, and engages film winding shaft 31 located therebelow to permit the latter to be rotated by means of winding lever 26.

As shown in FIG. 4, winding lever 26 is formed with finger tip 26b which may be engaged by a finger to rotate winding lever 26, thus rotating film winding shaft 31 through shaft 26c and claw ring 30 in order to wind up a film. Switching member 25 is rotated by a rotation of its integral switching dial 21, and as it rotates, contact 25a formed on its free end slides over printed board 24 to provide an electrical switching of a printing pattern formed on the board 24, thus changing the operation of a camera between a self-timer mode, an automatic exposure mode and a manual mode.

The described film winding lever assembly incorporates the water tight seal structure mentioned above in connection with FIG. 2. Specifically, a water tight seal structure associated with switching dial 21 is formed by step 113 and water repellent rubber 114 while another water tight seal structure associated with winding lever 26 is formed by step 213 and water repellent rubber 214. These seal structures prevent an ingress of water into the interior of the camera through a clearance between frame 20 and switching dial 21 and through a clearance between switching dial 21 and winding lever 26.

Figure 5:
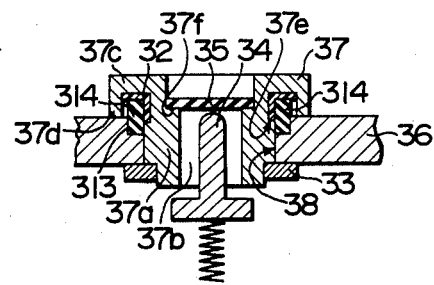
FIG. 5 is a cross section of a shutter button assembly of a camera to which the water tight seal structure of the invention is applied.
Figure 6:
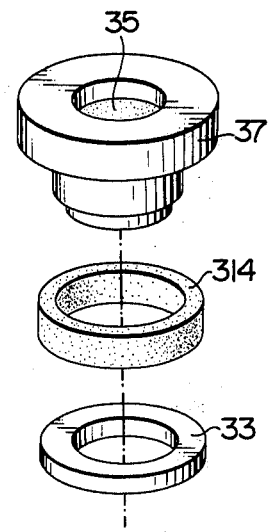
FIG. 6 is an exploded, perspective view of the shutter button assembly shown in FIG. 5.

FIGS. 5 and 6 illustrate the application of the water tight structure to a shutter button assembly including a film speed switching dial. FIG. 5 shows frame or outer panel which covers the entire camera. Opening 38 is formed in frame 36 for receiving film speed presetting, switching dial 37 in the form of a short sleeve having a diameter which stepwise decreases toward its bottom end. Annular step 313 is formed in the upper end of opening 38 to provide an increased diameter, and in accordance with the invention, water repellent rubber 314 in the form of a short sleeve is disposed on and fixedly connected with step 313 in the same manner as mentioned before. Annular member 32 which has an inverted L-configuration in cross section is disposed to extend along the upper-half and over the upper end face of rubber member 314 and is fixedly connected therewith by adhesion of mating surfaces. Switching dial 37 includes shank 37a which extends inside annular member 32 and rubber member 314 and through opening 38, and which is also centrally formed with opening 37b in which shutter button 34 is disposed. The upper end of shank 37a is contiguous with annular portion 37c having an upper end face which extends parallel to the upper surface of frame 36. Annular projection 37d depends downwardly from the lower surface of annular portion 37c along its full periphery and extends into abutment against the upper surface of frame 36. The lower end of shank 37a projects downwardly beyond frame 36 and is formed with threads which are engaged by fixing nut 33 so as to secure switching dial 37 to frame 36. The outer peripheral surface of shank 37a is formed with step 37e to receive annular member 32 therein. It will be seen that annular member 32 has its upper surface in engagement with the lower surface of annular portion 37c, and its inner peripheral surface and its lower end face in engagement with the outer peripheral surface of shank 37a and step 37e, respectively. The purpose of annular member 32 is to assure a facilitated and smooth rotation of switching dial 37, and at this end, is formed of a material such as Teflon which contributes to reducing the frictional resistance. Step 37f is formed in the upper end of opening 37b to provide an increased diameter, and disc 35 formed of rubber is fixedly connected with step 37f to block opening 37b. The upper end of shutter button 34 is located below rubber disc 35, and the depression of a central region of rubber disc 35 permits shutter button 34 to move down, thus operating a shutter release mechanism, not shown.

In the construction described above, it will be seen that the water seal structure of the type shown in FIG. 2 is constituted by step 313, water repellent rubber 314 and switching dial 37, and functions in the same manner as mentioned previously to prevent an ingress of water into the interior of the camera through a clearance between frame 36 and switching dial 37.

Figure 7:
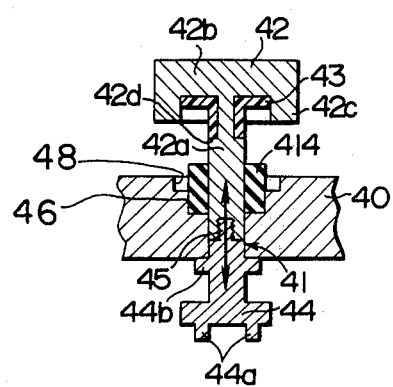
FIG. 7 is a cross section of a film rewind shaft assembly of camera to which the water tight seal structure of the invention is applied.

FIG. 7 shows the application of the water tight seal structure to a film rewind shaft assembly. Frame or outer panel 40 which covers the entire camera is formed with opening 41 in which film rewind shaft 42 is disposed so as to be rotatable and vertically movable therein. Film rewind shaft 42 is T-shaped in cross section, including shank 42a which is disposed to extend through opening 41, disc 42b integral with the top end of shank 42a, and project 42c depending downwardly from the lower surface of disc 42b along its full periphery. A pair of offset steps 46, 48 are formed in the top end of opening 41 to provide an increased diameter. Water repellent rubber 414 is disposed on and fixedly connected with lower step 46. Step 42d is formed in the top portion of shank 42a to provide a reduced diameter, and the recess defined by the step 42d receives rubber member 43 which has an inverter L-configuration in cross section. Rubber member 43 also extends across the entire lower surface of disc 42b. At its lower end, shank 42a of film rewind shaft 42 is provided with film cartridge drive member 44 which is secured thereto by threadable engagement shown at 45. Cartridge drive member 44 is adapted to engage a film cartridge to drive it for rotation. Specifically, on its lower end, cartridge drive member 44 is formed with claws 44a which are adapted to engage a cartridge. In addition, it is formed with flange 44b which is located slightly below the point of threadable engagement 45 and which is moved into abutment against the lower surface of frame 40 to prevent a further upward movement when film rewind shaft 42 is pulled upward. In FIG. 7, rewind shaft 42 is shown in its upper position where flange 44b bears against the lower surface of frame 40. A cartridge can be loaded below claws 44a under this condition, and then rewind shaft 42 can be moved down to cause claws 44a to engage the cartridge. After taking pictures, film rewind shaft 42 may be turned in a direction to rewind the film, whereupon the cartridge rotates therewith to achieve a film rewind operation.

When a water-proof camera having such film rewind shaft 42 is used in water, rewind shaft 42 is moved down to cause the lower end face of projection 42c to bear against the upper surface of frame 40. Under this condition, the structure comprising step 46, water repellent rubber 414 and film rewind shaft 42 constitutes the water tight seal structure illustrated in FIG. 2, with an increased tightness being achieved in the engagement between rubber member 43 and water repellent rubber 414, thus reliably preventing an ingress of water into the interior of the camera through a clearance between frame 40 and film rewind shaft 42.

What is claimed is:

1. A water tight seal structure comprising:
   a frame of a device to be sealed, said frame having an opening in it for tightly accommodating a movable operating member of said device, said opening having an upper end;
   a step formed in said upper end of said opening;
   a sleeve made of a flexible water-impermeable material disposed on said step, said sleeve having at least one surface abutting and adhesively coupled to said step in a water tight manner such that water cannot pass between said sleeve and said step into said frame; said sleeve having an inner peripheral surface tightly but movably abutting said movable operating member accommodated in said opening; and
   means for directing the passage of water under pressure from outside said frame to said sleeve, said means directing said water against said sleeve in such a manner that said sleeve is biased against said movable member by the pressure of said water so as to form a greater seal between said sleeve and said movable member.

2. A water tight seal structure according to claim 1, wherein said sleeve further has an upper surface for tightly engaging said movable operating member.

3. A water tight seal structure according to claim 1 or 2 wherein said sleeve comprises water repellent rubber.

4. A water tight seal structure according to claim 1 or 2 wherein said sleeve is polygonal in cross-section.

5. A water tight seal structure according to claim 4 wherein said sleeve is rectangular in cross-section.

6. A water tight structure according to claim 1, wherein said sleeve has a rectangular cross-section defined by a top end, a bottom end and inner and outer side ends, said outer side end abutting an entire side of said step, said nner side end abutting said movable operating member.

7. A water tight member according to claim 6, wherein said outer side end of said sleeve extends above said step and said means guides said water against said outer side end.

8. A water tight member according to claim 1, wherein said movable member does not deform said sleeve when said movable member is moved.

9. A water tight structure, comprising:
a movable operating member of a device to be sealed;
a section of said device having in it an opening tightly accommodating said member, said opening having an upper end;
a step formed in said upper end of said opening;
a sleeve made of a flexible, water-impermeable material one surface of which is disposed flatly against and adhesively coupled to said step in a water tight manner such that water cannot pass between said step and said sleeve into said device; and said sleeve having an inner peripheral surface tightly but movably abutting said member; and
means for directing the passage of water under pressure from outside said device to said sleeve, said means directing said water against said sleeve in such a manner that said sleeve is biased against said movable member by the pressure of said water so as to form a greater seal between said sleeve and said movable member.

10. The structure of claim 9, wherein said sleeve comprises water repellent rubber.

11. The structure of claim 9, wherein said sleeve has a polygonal cross-section.

12. The structure of claim 11, wherein said sleeve has a rectangular cross-section.

13. The structure of claim 9, wherein said sleeve further has an upper surface and wherein said member comprises: a shank body accommodated in said opening and a disc section connected to said shank body and having an undersurface that tightly abuts said upper surface of said sleeve.

14. The structure of claim 13, wherein said undersurface of said disc has an annular projection near the periphery of said disc and abutting said section of said device.

15. The structure of claim 9, wherein said sleeve has a rectangular cross-section defined by a top end, a bottom end and inner and outer side ends, said outer side end abutting an entire side of said step, said inner side end abutting said movable operating member.

16. The structure of claim 15, wherein said outer side end of said sleeve extends above said step and said means guides said water against said outer side end.

17. The structure of claim 9, wherein said movable member does not deform said sleeve when said movable member is moved.

18. A water tight seal structure according to claim 4 further comprising an annular member formed of a low-friction material, and fixedly connected to both said inner peripheral surface and said upper end face of said sleeve, said annular member having an inner peripheral surface and an upper end face for tightly engaging said movable operating member.

19. The structure of claim 13, further comprising an annular member having an L-shaped cross-section disposed abutting said under surface of said disk section and abutting said shank body.

20. The structure of claim 19, wherein said shank body has a portion adjacent said disk section that is of a reduced diameter, whereby a recess in said shank body is defined, said annular member being received in said recess.

21. The structure of claim 19, wherein said annular member is made of a low-friction material.

22. The structure of claim 19, wherein said annular member is affixed to said sleeve.

23. The structure of claim 19, wherein said annular member is affixed to said movable operating member.

* * * * *